US008919117B2

(12) United States Patent
Ingvast

(10) Patent No.: US 8,919,117 B2
(45) Date of Patent: Dec. 30, 2014

(54) ENERGY CELL OPERABLE TO GENERATE A PRESSURIZED FLUID VIA BLADDER MEANS AND A PHASE CHANGE MATERIAL

(75) Inventor: Håkan Ingvast, Själevad (SE)

(73) Assignee: Exencotech AB, Sollentuna (SE)

( * ) Notice: Subject to any disclaimer, the term of this patent is extended or adjusted under 35 U.S.C. 154(b) by 563 days.

(21) Appl. No.: 13/141,441

(22) PCT Filed: Dec. 22, 2008

(86) PCT No.: PCT/SE2008/051549
§ 371 (c)(1),
(2), (4) Date: Jun. 22, 2011

(87) PCT Pub. No.: WO2010/074616
PCT Pub. Date: Jul. 1, 2010

(65) Prior Publication Data
US 2011/0252783 A1    Oct. 20, 2011

(51) Int. Cl.
*F03G 7/06* (2006.01)
(52) U.S. Cl.
CPC ...................................... *F03G 7/06* (2013.01)
USPC ............................... 60/527; 60/530; 417/478
(58) Field of Classification Search
USPC .......... 60/527–531; 165/DIG. 346, DIG. 381; 122/367.3; 417/379, 478
See application file for complete search history.

(56) References Cited

U.S. PATENT DOCUMENTS

| | | | | |
|---|---|---|---|---|
| 2,884,866 A | * | 5/1959 | Patterson | 417/379 |
| 3,062,153 A | * | 11/1962 | Losey | 417/394 |
| 3,986,354 A | * | 10/1976 | Erb | 60/325 |
| 3,989,101 A | * | 11/1976 | Manfredi | 165/86 |
| 4,061,184 A | * | 12/1977 | Radcliffe | 165/286 |
| 4,186,558 A | | 2/1980 | Kuo | |
| 4,220,006 A | * | 9/1980 | Kindt | 60/527 |
| 4,395,976 A | * | 8/1983 | de Lallee et al. | 122/32 |

(Continued)

FOREIGN PATENT DOCUMENTS

GB    1 341 163    12/1973

OTHER PUBLICATIONS

International Preliminary Report on Patentability/Written Opinion of the International Searching Authority for corresponding International Application No. PCT/SE2008/051549, issued Jun. 29, 2011.

(Continued)

*Primary Examiner* — Thomas Denion
*Assistant Examiner* — Laert Dounis
(74) *Attorney, Agent, or Firm* — Nixon & Vanderhye PC

(57) ABSTRACT

An energy cell generates pressurized fluid for use as an energy source when a phase change material (PCM) changes from solid to liquid phase. The energy cell includes housing means holding the PCM, insulating means between the housing means and the PCM, heat exchanging means encompassed by the PCM, multiple pipe means, and multiple disc means, each provided with multiple aperture means and each encompassing a part of the pipe, and a centrally located bladder means with open end parts fixed to the energy cell, and which is flexible between the end parts. Each pipe means includes a heat transfer media. The PCM encompasses the pipe means and the disc means and is able to pass through the aperture means. The bladder means includes a hydraulic fluid flowing in and out through the open end parts of the bladder means and is affected by the PCM.

12 Claims, 9 Drawing Sheets

(56) References Cited

U.S. PATENT DOCUMENTS

| | | | |
|---|---|---|---|
| 5,025,627 A * | 6/1991 | Schneider | 60/527 |
| 5,220,954 A | 6/1993 | Longardner et al. | |
| 5,263,323 A | 11/1993 | Maus et al. | |
| 5,365,887 A * | 11/1994 | Fenn | 122/18.4 |
| 5,375,983 A * | 12/1994 | Engels | 417/379 |
| 6,564,551 B1 * | 5/2003 | Stock | 60/516 |
| 2008/0066488 A1 * | 3/2008 | Take et al. | 62/513 |
| 2011/0120131 A1 * | 5/2011 | Ostlund | 60/670 |

OTHER PUBLICATIONS

International Search Report for PCT/SE2008/051549, mailed Sep. 8, 2009.

* cited by examiner

A-A

Detail D

ENERGY CELL OPERABLE TO GENERATE A PRESSURIZED FLUID VIA BLADDER MEANS AND A PHASE CHANGE MATERIAL

This application is the U.S. national phase of International Application No. PCT/SE2008/051549, filed 22 Dec. 2008, which designated the U.S., the entire contents of which is hereby incorporated by reference.

FIELD OF THE INVENTION

The present invention relates to an energy cell operable to generate a pressurized fluid for use as an energy source when a phase change material (PCM) changes from solid phase to liquid phase.

BACKGROUND OF THE INVENTION

The patent document U.S. Pat. No. 4,079,596 A relates to a heat engine, or a heat pump, in which the working medium used is subjected alternatively to solidification and melting operations. A working medium so used is referred to as an type working medium. In the heat engine, an S/L type working medium is subject to cyclic operations, each cycle comprises a high temperature melting step conducted under a first pressure, and a low temperature solidification step conducted under a second pressure. In the heat pump, each cycle comprises a high temperature solidification step conducted under a first pressure and a low temperature melting step conducted under a second pressure. When a non-aqueous medium is used, the first pressure and the second pressure are a relatively high pressure and a relatively low pressure, respectively. When an aqueous medium is used the two pressures are a relatively low pressure and a relatively high pressure, respectively. It is noted that the operation of a heat pump is the reverse operation of a heat engine.

The patent document U.S. Pat. No. 5,263,323 A relates to a thermal actuator, also known as a heat capacitance motor, which derives its energy from the physical expansion of paraffin wax as it changes from solid to liquid when heated within an enclosure such as a cylinder. This energy is converted into mechanical force which causes translation of a piston slidably mounted within the cylinder, thus creating hydrostatic pressure which is converted to work. The thermal actuator may be utilized in various drug delivery systems in which the hydrostatic pressure created by the actuator is used to expel the contents of a syringe.

The patent document GB 1,341,163 A relates to a device for converting thermal energy to mechanical energy, wherein heat is applied to liquid in one or more annular chambers which is/are in communication with, but thermally insulated from, a further annular chamber so as to cause a volume expansion thereof, and hence a movement of an actuating rod attached thereto. The device comprises annular chambers 9, 10, 2, chamber 2 being seated by spring bellows 6. Heating elements 11, 12 vaporize the liquid in chambers 9, 10, thereby causing contraction of the bellows 6 and hence movement of a rod 7. Use of only one of the elements 11, 12 moves the rod 7 by a half-stroke.

The patent document U.S. Pat. No. 4,283,915 A relates to a hydraulic fluid generator. Two sources of water with a temperature differential of say 20° F. flow alternatively through heat exchanger tubes to expand and contract a working liquid that has a high coefficient of thermal expansion, the whole working cycle being carried out below the boiling point of the working liquid. With check valves preventing reverse flow, the expansion and contraction of the working liquid provides a high pressure hydraulic output which may be used to drive a hydraulic motor. To provide substantially steady output flow, four banks of heat exchangers may be operated sequentially with hydraulic accumulator means smoothing out the flow pulsations. Each bank has a four-stage operating cycle and electrical circuitry controls the four banks simultaneously to cause the four different stages to occur in certain of the four different banks in staggered relation for producing a substantially constant overall hydraulic output.

The patent document U.S. Pat. No. 5,375,983 A relates to a system for utilizing the expansion of water as the water is transformed from a liquid state to a solid state includes a rigid outer container and a flexible inner bladder received centrally within the outer container. Hydraulic fluid is received within the bladder, and water is disposed between the bladder and outer container. The hydraulic fluid is pressurized as the water is lowered in temperature to a freezing temperature. The pressurized fluid may be stored for selective release from the bladder to produce work utilizing the energy of the pressure within the hydraulic fluid.

The patent document WO 89/12748 A1 relates to a process and apparatus for conversion of low value thermal energy into mechanical energy by thermal expansion of an inert liquid expansion medium, which in a relatively low temperature range of not higher than 80° C. has a relatively high expansion coefficient, which medium is contained in pressure tubes included in a regeneration cylinder, which pressure tubes are stepwise heated or cooled by a thermal medium circulating in the cylinder without parts of the thermal medium with different temperatures being intermingled. Examples of the expansion medium are paraffin's.

The above presented documents disclose different solutions within this technical area without presenting art optimal solution regarding thermal efficiency and structural strength. Furthermore, the solutions presented in these documents are not optimal regarding power density, manufacturing efficiency and manufacturing costs.

SUMMARY OF THE INVENTION

The above mentioned problems are solved by an energy cell operable to generate a pressurized fluid for use as an energy source when a phase change material (PCM) changes from solid phase to liquid phase according to claim 1. The energy cell comprises a housing means holding the phase change material (PCM). Furthermore, the energy cell also comprises an insulating means arranged between the housing means and the phase change material (PCM). The energy cell also comprises a heat exchanging means encompassed by the phase change material (PCM) and comprising a number of pipe means, and a number of disc means, each provided with a number of aperture means and each encompassing a part of the pipe means. Between two consecutive disc means there is a distance. Furthermore, the energy cell also comprises a centrally located, flexible bladder means which at its end parts are fixed to the energy cell and are open, and between the end parts being flexible. Each of the pipe means comprises a heat transfer media. The phase change material (PCM) encompass the pipe means, the disc means and being able to pass through the aperture means. The bladder means comprises a hydraulic fluid being able to flow in and out through the open end parts of the bladder means, and being affected by the phase change material (PCM).

A main advantage with the energy cell according to the present invention is that it is optimized for high thermal efficiency and structural strength. Furthermore, with this energy cell it is possible to minimize both thermal and mechanical losses. Furthermore, the energy cell according to the present invention is optimized regarding power density, manufacturing efficiency and manufacturing costs.

A further advantage in this context is achieved if the housing means comprises a cylinder block means, a cylinder head means, and a cylinder bottom means, wherein the cylinder head means comprises a first grommet means for each pipe means, and wherein the cylinder bottom means comprises a first grommet means for each pipe means.

Furthermore, it is an advantage in this context if the energy cell also comprises an inlet interface means connected to the cylinder head means, and operable to feed the heat transfer media to the pipe means, and an outlet interface means connected to the cylinder bottom means, and operable to discharge the heat transfer media from the pipe means.

A further advantage in this context is achieved if the inlet interface means comprises a container means in connection to the cylinder head means, and a first connector means for in flow of hot heat transfer media, and a valve means for switching on or of in flow of hot heat transfer media, and a second connector means for in flow of cold heat transfer media, and a valve means for switching on or off of cold heat transfer media, and if the outlet interface means comprises a container means in connection to the cylinder bottom means, and a first connector means for out flow of hot heat transfer media, and a valve means for switching on or off of out flow of hot heat transfer media, and a second connector means for out flow of cold heat transfer media, and a valve means for switching on or off of out flow of cold heat transfer media.

According to another embodiment, it is an advantage if the inlet interface means comprises a container means in connection to the cylinder head means, and a connector means for in flow of hot or cold heat transfer media, and a valve means for switching between in flow of hot or cold heat transfer media, and if the outlet interface means comprises a container means in connection to the cylinder bottom means, and a connector means for out flow of hot or cold heat transfer media, and a valve means for switching between out flow of hot or cold heat transfer media.

Furthermore, it is an advantage in this context if the pipe means are provided with a number of inner flanges.

A further advantage in this context is achieved if the energy cell also comprises a first pipe means and a second pipe means, connected to an end part each of the bladder means.

According to another embodiment, it is an advantage if the energy cell also comprises a centrally located pipe means provided with apertures, wherein a middle part of the pipe means is arranged in the bladder means.

Furthermore, it is an advantage in this context if the cylinder head means also comprises a second grommet means for the pipe means, and if the cylinder bottom means also comprises a second grommet means for the pipe means, and if the centrally located pipe means is fixed in both the cylinder head means and the cylinder bottom means and pass through both the second grommet means.

A further advantage in this context is achieved if the first grommet means, and the second grommet means are insulated.

Furthermore, it is an advantage in this context if the inner walls of the inlet interface means and the inner walls of the outlet interface means are insulated.

A further advantage in this context is achieved if the heat transfer media is water, oil, or other suitable media in liquid or gas phases.

Furthermore, it is an advantage in this context if each energy cell comprises a connecting means operable to connect energy cells in series via their centrally located pipe means, or via their first and second pipe means. This means that several energy cells can be connected to each other, which implies that it is possible to design both small and large systems.

A further advantage in this context is achieved if the energy cell also comprises a movable means in connection to, and being affected by the phase change material (PCM) in order to generate mechanical energy.

It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

BRIEF DESCRIPTION OF THE DRAWINGS

FIG. 5A is a side view of a disc means comprised in the heat exchanging means of the energy cell according to the present Invention, while

DETAILED DESCRIPTION OF PREFERRED EMBODIMENTS

Figure 1:
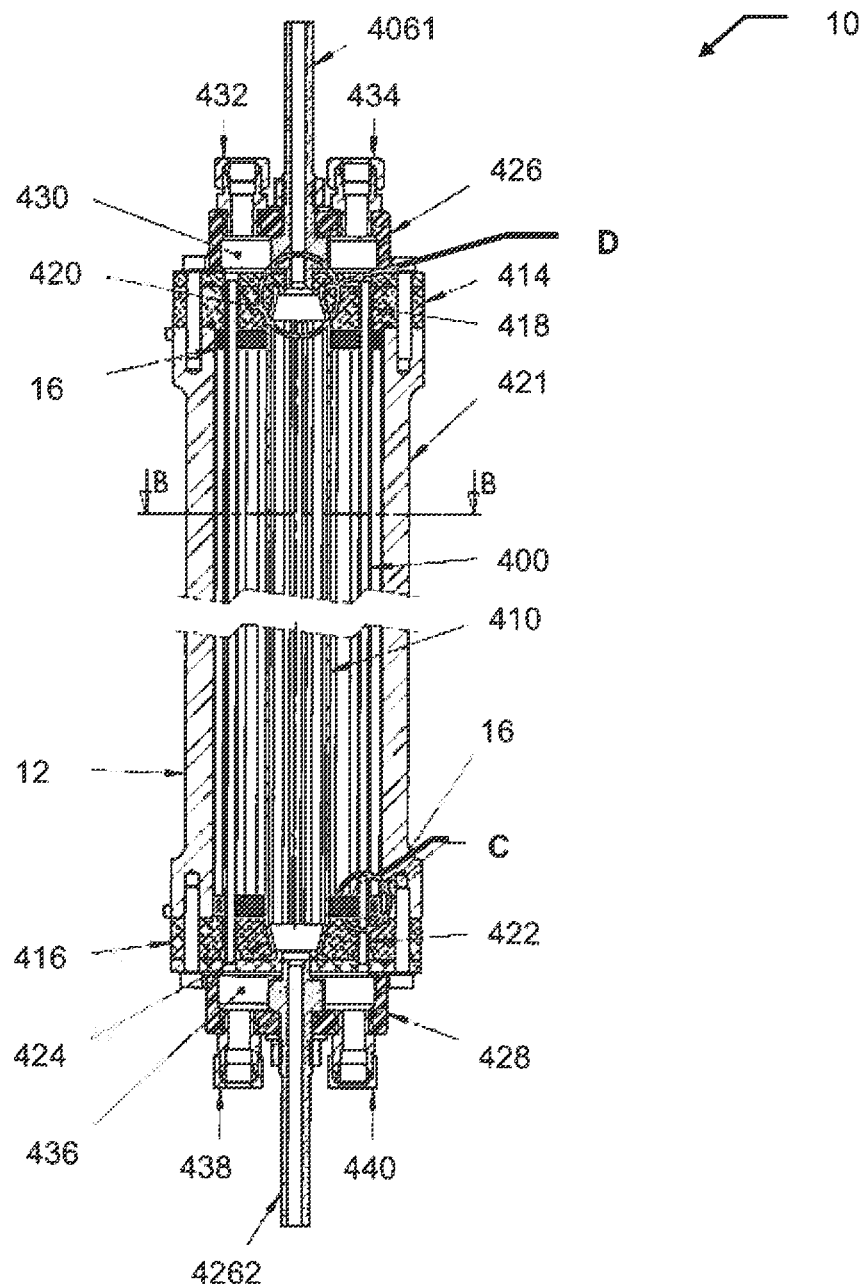
FIG. 1 is a sectional view of a first embodiment of an energy cell operable to generate a pressurized fluid according to the present invention.

In FIG. 1 there is disclosed a sectional view of a first embodiment of an energy cell 10 operable to generate a pressurized fluid for use as an energy source when a phase change material (PCM) changes from solid phase to liquid phase. The energy cell 10 comprises a housing means 12 holding the phase change material (PCM). The energy cell 10 also comprises an insulating means 14 (see FIG. 3) arranged between the housing means 12 and the phase change material (PCM). Furthermore, the energy cell 10 also comprises a heat exchanging means 16 encompassed by the phase change material (PCM). The heat exchanging means 16 comprises a number of pipe means 400, wherein heat transfer media flows through the pipe means 400. Furthermore, the heat exchanging means 16 also comprises a number of disc means 402, 404 (not disclosed in FIG. 1, but disclosed in FIG. 5).

In FIG. 5 there is apparent that the disc means 402, 404 each is provided with a number of aperture means 500, so that the phase change material (PCM) can pass through the aperture means 500. Furthermore, the disc means 402, 404 each encompasses a part of the pipe means 400.

As also is apparent in FIG. 1, the energy cell 10 also comprises a centrally located, bladder means 410 which is flexible. The bladder means 410 is fixed to the energy cell 10, at the end parts of the bladder means 410. Furthermore, the bladder means 410 is open at its end parts and connect to a first pipe means 4061 and a second pipe means 4062. The bladder means 410 comprises a hydraulic fluid being able to flow in and out through the open end parts of the bladder means 410, and being affected by the phase change material (PCM).

As also is apparent in FIG. 1, the housing means 12 comprises a cylinder block means 421, a cylinder head means 414, and a cylinder bottom means 416. The cylinder head means 414 comprises a first grommet means 418 for each pipe means 400, and the cylinder bottom means 416 comprises a first grommet means 422 for each pipe means 400. Furthermore, as also is apparent in FIG. 1, the cylinder head means 414 also comprises a second grommet means 420 for the first pipe means 4061. The cylinder bottom means 416 also comprises a second grommet means 424 for the second pipe means 4062.

The energy cell 10 also comprises an inlet interface means 426 connected to the cylinder head means 414. The inlet interface means 426 is operable to feed the heat transfer media to the pipe means 400. Furthermore, the energy cell 10 also comprises an outlet interface means 428 connected to the cylinder bottom means 416. The outlet interface means 428 is operable to discharge the heat transfer media from the pipe means 400.

Also disclosed in FIG. 1 is the fact that the inlet interface means 426 comprises a container means 430 in connection to the cylinder head means 414. Furthermore, the inlet interface means 426 also comprises a first connector means 432 for in flow of hot heat transfer media, and a second connector means 434 for in flow of cold heat transfer media. As also is apparent in FIG. 1, the outlet interface means 428 comprises a container means 436 in connection to the cylinder bottom means 416. Furthermore, the outlet interface means 428 also comprises a first connector means 438 for out flow of hot heat transfer media, and a second connector means 440 for out flow of cold heat transfer media.

Figure 2:
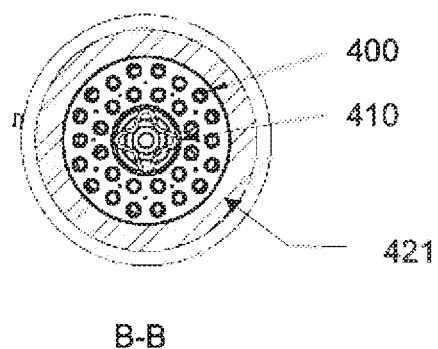
FIG. 2 is a sectional view of the energy cell disclosed in FIG. 1, taken along the section B-B in FIG. 1.

In FIG. 2 there is disclosed a sectional view of the energy cell 10 disclosed in FIG. 1, taken along the section B-B in FIG. 1. Here is disclosed the distribution of pipe means 400, and centrally located in FIG. 2 is the bladder means 410.

Figure 3:
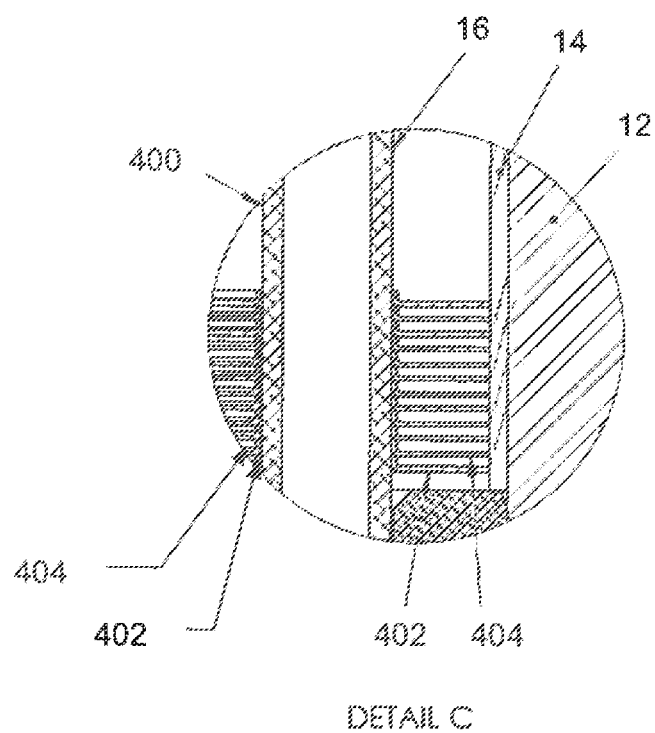
FIG. 3 is a sectional view of detail C disclosed in FIG. 1, here disclosed in a larger scale.

In FIG. 3 there is disclosed a sectional view of the circle C disclosed in FIG. 1, here disclosed in a larger scale. A part of the housing means 12 provided with its insulating means 14 are disclosed in this figure. Furthermore, the heat exchanging means 16 is disclosed in the form of one pipe means 400 provided with a number of disc means 402, 404.

Figure 4:
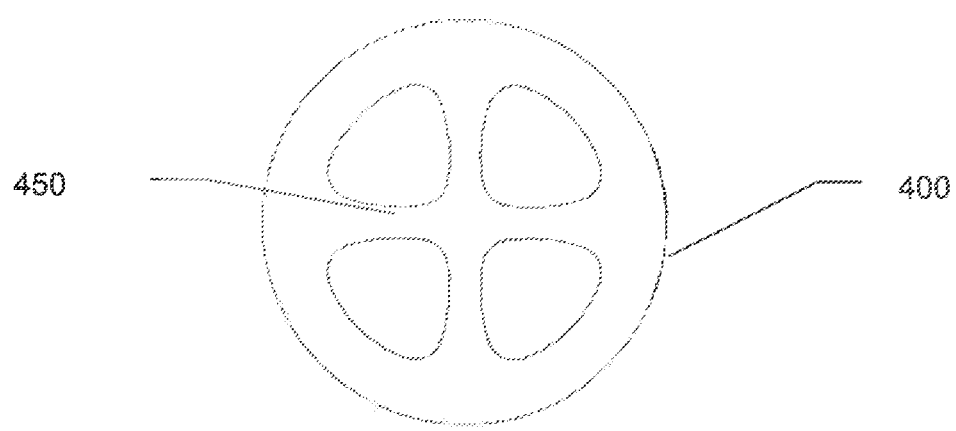
FIG. 4 is a sectional view of a pipe means comprised in the heat exchanging means of the energy cell according to the present invention.

In FIG. 4 there is disclosed a sectional view of a pipe means 400 comprised in the heat exchanging means 16 of the energy cell 10 according to the present invention. As is apparent in this figure, each pipe means 400 is provided with a number of inner flanges 450.

Figure 5A:
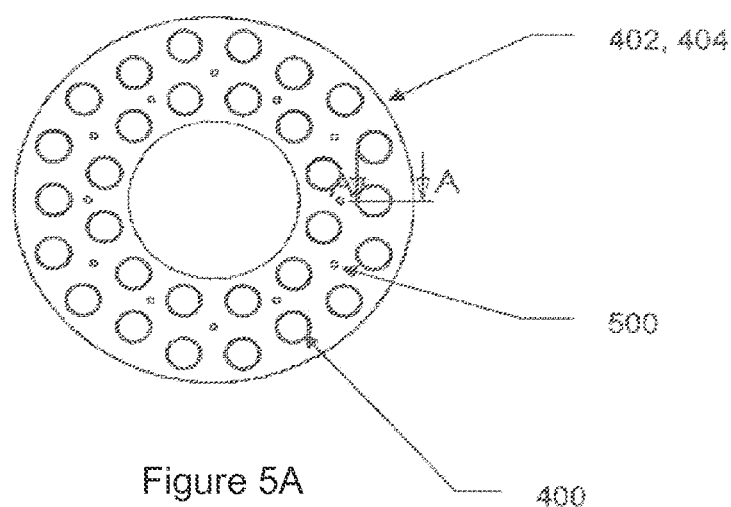
Figure 5B:
FIG. 5B is a view in section A-A, of an aperture arranged for a pipe means.

In FIG. 5A there is disclosed a side view of a disc means 402, 404 comprised in the heat exchanging means 16 of the energy ceil 10 according to the present invention. As is apparent in this figure, each disc means 402, 404 is provided with a number of aperture means 500. The phase change material (PCM) can pass through these aperture means 500. Also disclosed in FIG. 5B, in section A-A, is an aperture arranged for the pipe means 400 (not disclosed).

Figure 6A:
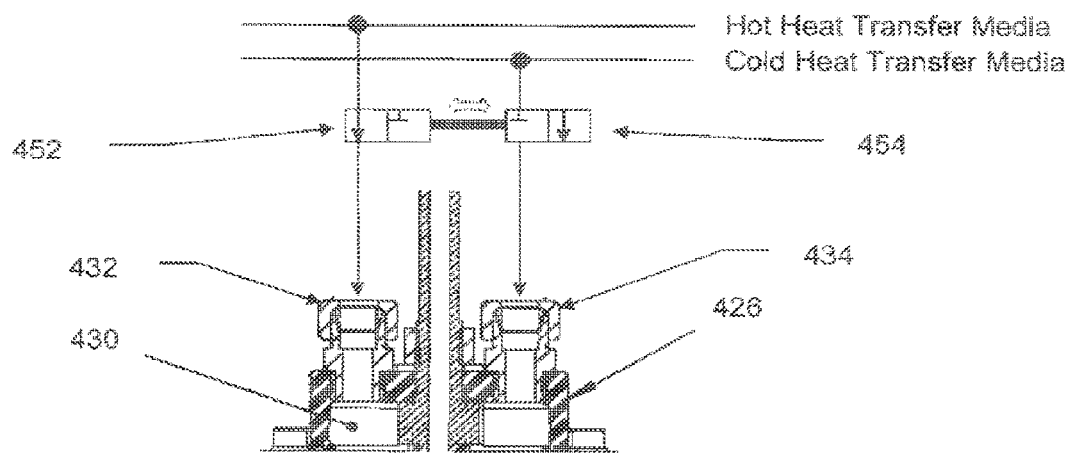
FIGS. 6A and 6B are sectional views of a first embodiment of the inlet interface means and the outlet interface means, respectively, which are parts of the energy ceil disclosed in FIG. 1.

In FIG. 6A there is disclosed a sectional view of a first embodiment of the inlet interface means 426 and the outlet interface means 428, which are parts of the energy cell 10 disclosed in FIG. 1. This first embodiment is also partly disclosed in FIG. 1. As is apparent in this FIG. 6A, the inlet interface means 426 comprises a container means 430, a first connector means 432, and a second connector means 434. Furthermore, the energy cell 10 also comprises a valve means 452 connected to the first connector means 432 and operable to switch on or off in flow of hot heat transfer media. The energy cell 10 also comprises a valve means 454 connected to the second connector means 434 and operable to switch on or off in flow of cold heat transfer media. As is apparent in the lower FIG. 6B, the outlet interface means 428 comprises a container means 436, a first connector means 438, and a second connector means 440. The energy cell 10 also comprises a valve means 456 connected to the first connector means 438 and operable to switch on or off of out flow of hot heat transfer media. Furthermore, the energy cell also comprises a valve means 458 connected to the second connector means 440 and operable to switch on or off of out flow of cold heat transfer media. An advantage with this solution is that the valve means are situated dose to the energy cell, implying that the thermal losses will decrease which will lead to an increased efficiency. A minor disadvantage with this solution is the number of valve means required. It is also pointed out that the valve means 452 and 454 are working synchronized, i.e., the valve means 452 is on and the valve means 454 is off, or vice versa. The same applies for the valve means 456 and 458.

Figure 6B:
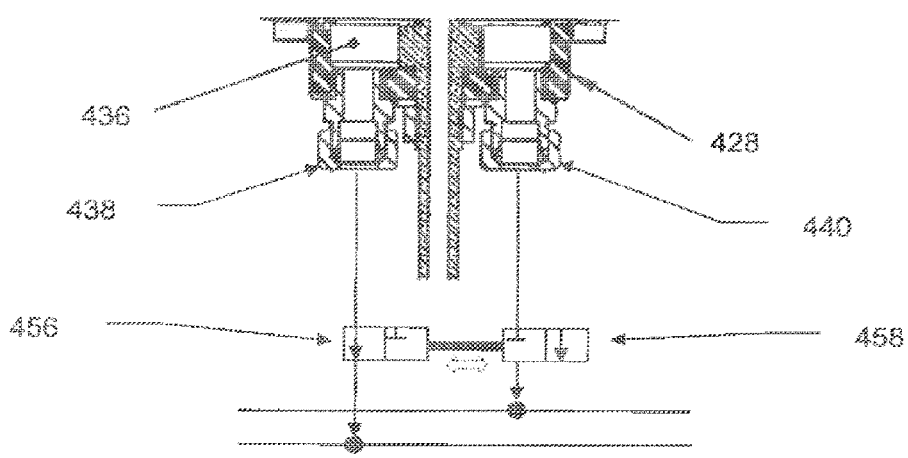
Figure 7A:
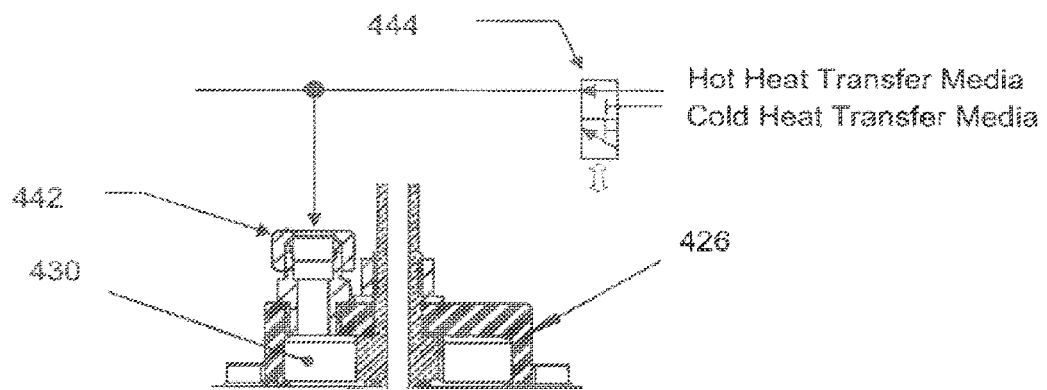
FIGS. 7A and 7B are sectional views of a second embodiment of the inlet interface means and the outlet interface means, respectively, which are parts of the energy cell disclosed in FIG. 1.
Figure 7B:
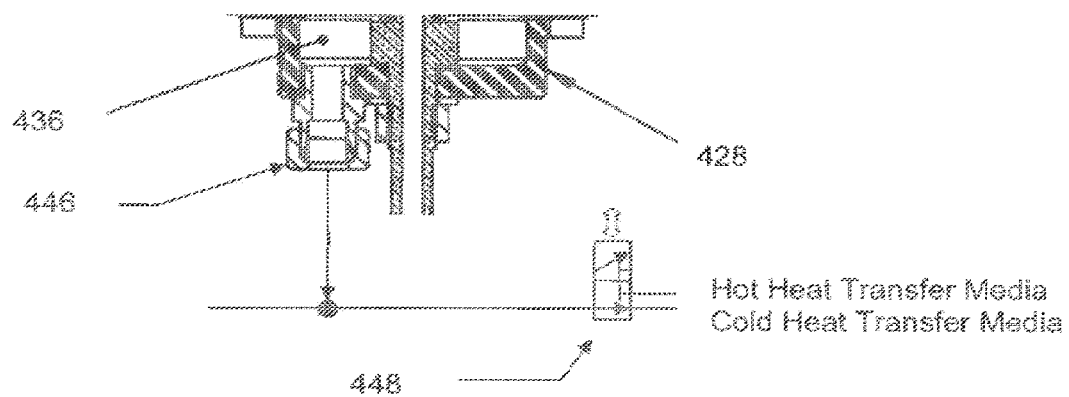

In FIGS. 7A and 7B there is disclosed a sectional view of a second embodiment of the inlet interface means 426 and the outlet interface means 428, respectively, which are parts of an energy cell 10 according to the present invention. As is apparent in this FIG. 7A, the inlet interface means 426 comprises a container means 430, and a connector means 442 for in flow of hot or cold heat transfer media. The energy cell 10 also comprises a valve means 444 connected to the connector means 442 and operable to switch between in flow of hot or cold heat transfer media. As is apparent in the lower FIG. 7B the outlet interface means 428 comprises a container means 436 and a connector means 446 for out flow of hot or cold heat transfer media. Furthermore, the energy cell 10 also comprises a valve means 448 connected to the connector means 446 and operable to switch between out flow of hot or cold heat transfer media. An advantage with this solution, in comparison to the solution disclosed in FIGS. 6A and 6B, is that there is required a less number of valve means. A disadvantage with this solution is that the thermal losses are increased in comparison to the solution disclosed in FIG. 6.

Figure 8:
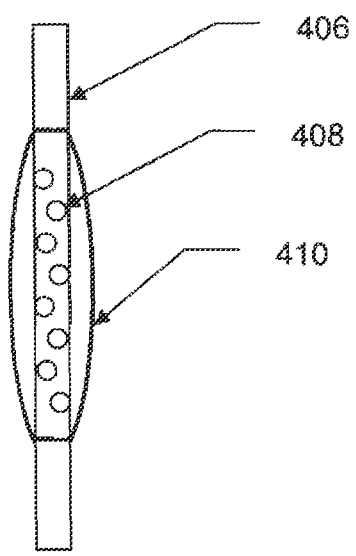
FIG. 8 is a schematically view of a part of another embodiment of an energy cell according to the present invention.

In FIG. 8 there is disclosed a schematic view of a part of a second embodiment of an energy cell 10 according to the present invention. In this embodiment the energy cell 10 also comprises a centrally located pipe means 406 provided with apertures 408. The middle part of the pipe means 406 is arranged inside the bladder means 410, which only is schematically disclosed in this figure. Although not disclosed in this figure, the centrally located pipe means 406 is fixed in both the cylinder head means 414 and the cylinder bottom means 416 and pass through both the second grommet means 420, 424 (See FIG. 1). The pipe means 406 comprises a hydraulic fluid, which can flow in and out through the apertures 408, and consequently more or less fin the bladder means 410. This embodiment with the pipe means 406 will reduce the bulging and stress of the cylinder head means 414 and cylinder bottom means 416 when the pressure in the energy cell 10 rises.

Figure 9:
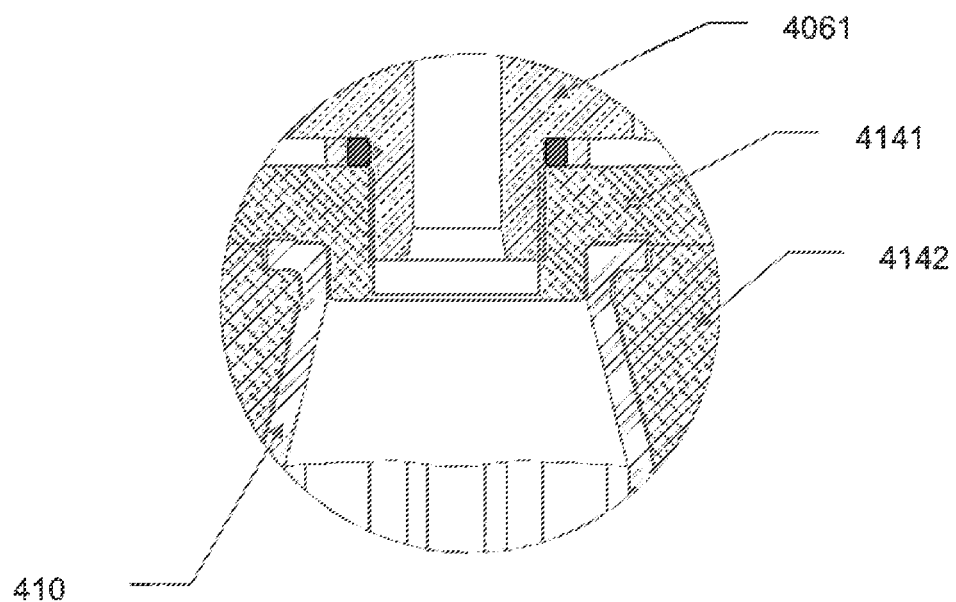
FIG. 9 is a sectional view of detail D disclosed in FIG. 1, here disclosed in a larger scale.

In FIG. 9 there is disclosed a sectional view of circle D disclosed in FIG. 1, here disclosed in a larger scale. In this figure the first pipe means 4061 is disclosed. Also disclosed is the upper part of the bladder means 410, and how it is fixed to the energy cell 10. As is apparent in this figure, the cylinder head means 414 is divided into two different parts 4141 and 4142. An upper collar of the bladder means 410 is fixed between the two parts 4141, 4142 of the cylinder head means 414. As also is apparent in this figure is that the bladder means 410 is open against the first pipe means 4061. It is pointed out that the same applies for the cylinder bottom means 416, the second pipe means 4062 and the bladder means 410, although it is not disclosed in this figure.

According to a preferred embodiment of the energy cell 10, the first grommet means 418, 422, and the second grommet means 420, 424 are insulated.

Furthermore, according to another embodiment of the energy cell 10, the inner walls of the inlet interface means 426, and the inner walls of the outlet interface means 428 are insulated.

According to a preferred embodiment of the energy cell 10, the heat transfer media is water, oil, or other suitable media in liquid or gas phases.

Furthermore, according to another embodiment, each energy cell 10 also comprises a connecting means (not disclosed) operable to connect energy cells 10 in series via their centrally located pipe means 406, or via their first and second pipe means 4061, 4062.

According to a preferred embodiment of the energy cell 10, it also comprises a movable means (not disclosed) arranged in connection to, and being affected by the phase change material (PCM) in order to generate mechanical energy.

Now follow a functional description of the process cycle for the energy cell 10 according to the present invention, divided into four phases as in a PV-diagram, pressure-volume-diagram.

Compression-Phase:

1. The pressure in the energy cell 10 is raised to working pressure by putting the hydraulic fluid under pressure via the first pipe means 4061, or via the centrally located pipe means 406. Normally, the phase change material (PCM) is in solid phase during the compression. To decrease the stress on the pipe means 400 and the disc means 402, 404 of the heat exchanging means 16 and improve the lifetime of the energy cell 10, the compression could also be done at the start of the work-phase described below. By doing this the phase change material (PCM) will start to melt near the pipe means 400 and the disc means 402, 404, which lead to a lowered friction and a better stress situation.

Work-Phase:

2. A high temperatured heat transfer media (e.g. water) flows e.g. through the first connector means 432 via the inlet interface means 426 to the heat exchanging means 16.

3. The heat energy is transferred from the heat transfer media to the phase change material (PCM) via the pipe means 400 and the disc means 402, 404 in the heat exchanging means 16.

4. The phase change material (PCM) goes fluid and expands under high pressure and pushes the bladder means 410 inwards (makes the bladder means 410 cave in).

5. The moving bladder means 410 makes the hydraulic fluid contained in the bladder means 410 to flow out via the first pipe means 4061, or via the pipe means 406 under a high pressure.

Decompression-Phase:

6. The hydraulic pressure is released from high to low pressure making the phase change material (PCM) spring back which lead to that the hydraulic fluid contained in the bladder means 410 flow out via the first pipe means 4061, or via the pipe means 406 under a variable (high to low) pressure.

Cooling-Phase:

7. A low temperatured heat transfer media (e.g. water) flows e.g. through the second connector means 434 via the inlet interface means 426 to the heat exchanging means 16.

8. The heat energy is transferred from the phase change material (PCM) to the heat transfer media via the pipe means 400 and the disc means 402, 404 in the heat exchanging means 16.

9. The phase change material (PCM) goes solid and contracts and drags the bladder means 410 outwards. The bladder means 410 is also forced out by a light pressure in the hydraulic fluid (approximately 10 bar).

The process cycle is completed and the energy cell 10 is ready for a new cycle.

The invention is not limited to the embodiments described in the foregoing. It will be obvious that many different modifications are possible within the scope of the following Claims.

The invention claimed is:

1. An energy cell operable to generate a pressurized fluid for use as an energy source when a phase change material (PCM) changes from solid phase to liquid phase, the energy cell comprising:
    a housing means holding said phase change material (PCM),
    an insulating means arranged between said housing means, and said phase change material (PCM),
    a heat exchanging means encompassed by said phase change material (PCM) and comprising a number of pipe means,
    a number of disc means, each provided with a number of aperture means and each encompassing a part of said pipe means, wherein there is a distance between two consecutive disc means, and
    a centrally located, flexible bladder means having a pair of open end parts which are fixed to said energy cell, and being flexible between said open end parts,
    wherein each of said pipe means comprises a heat transfer media,
    wherein said phase change material (PCM) encompasses said pipe means and said disc means and is able to pass through said aperture means,
    wherein said bladder means comprises a hydraulic fluid being able to flow in and out through said open end parts of said bladder means, and being affected by said phase change material (PCM),
    wherein said housing means comprises a cylinder block means, a cylinder head means, and a cylinder bottom means, wherein said cylinder head means comprises a first grommet means for each pipe means, and wherein said cylinder bottom means comprises a first grommet means for each pipe means, and
    wherein said energy cell also comprises a centrally located pipe provided with apertures, wherein a middle part of said centrally located pipe is arranged inside the bladder means.

2. The energy cell according to claim 1, wherein said energy cell also comprises an inlet interface means connected to said cylinder head means, and operable to feed said heat transfer media to said pipe means, and an outlet interface means connected to said cylinder bottom means, and operable to discharge said heat transfer media from said pipe means.

3. The energy cell according to claim 2, wherein said inlet interface means comprises a container means in connection to said cylinder head means, and a first connector means for inflow of hot heat transfer media, and a valve means for switching on or off of inflow of hot heat transfer media, and a second connector means for inflow of cold heat transfer media, and a valve means for switching on or off of inflow of cold heat transfer media, and wherein said outlet interface means comprises a container means in connection to said cylinder bottom means, and a first connector means for outflow of hot heat transfer media, and a valve means for switching on or off of outflow of hot heat transfer media, and a second connector means for outflow of cold heat transfer media, and a valve means for switching on or off of outflow of cold heat transfer media.

4. The energy cell according to claim 2, wherein said inlet interface means comprises a container means in connection to said cylinder head means, and a connector means for inflow of hot or cold heat transfer media, and a valve means for switching between inflow of hot or cold heat transfer media, and wherein said outlet interface means comprises a container means in connection to said cylinder bottom means, and a connector means for outflow of hot or cold heat transfer media, and a valve means for switching between outflow of hot or cold heat transfer media.

5. The energy cell according to claim 1, wherein said pipe means are provided with a number of inner flanges.

6. The energy cell according to claim 1, wherein said energy cell also comprises a first pipe means and a second pipe means, connected to an end part each of said bladder means.

7. The energy cell according to claim 1, wherein said cylinder head means also comprises a second grommet means for said centrally located pipe means, and wherein said cylinder bottom means also comprises a second grommet means for said centrally located pipe means, and wherein said centrally located pipe means is fixed in both said cylinder head means and said cylinder bottom means and pass through both said second grommet means.

8. The energy cell according to claim 7, wherein said first grommet means, and said second grommet means are insulated.

9. The energy cell according to claim 2, wherein the inner walls of said inlet interface means and the inner walls of said outlet interface means are insulated.

10. The energy cell according to claim 2, wherein said heat transfer media is water, or oil in liquid or gas phase.

11. The energy cell according to claim 6, wherein each energy cell also comprises a connecting means operable to connect energy cells in series via their first and second pipe means.

12. The energy cell according to claim 1, wherein each energy cell also comprises a connecting means operable to connect energy cells in series via centrally located pipes of the energy cells.

* * * * *